United States Patent [19]

Taylor

[11] Patent Number: 4,741,254

[45] Date of Patent: May 3, 1988

[54] PUMP PLUNGER

[76] Inventor: Julian S. Taylor, 8300 SW. 8th, Oklahoma City, Okla. 73128

[21] Appl. No.: 873,559

[22] Filed: Jun. 12, 1986

[51] Int. Cl.⁴ ............................................. F16J 9/00
[52] U.S. Cl. ...................................... 92/248; 92/255; 92/260; 29/156.4 R; 29/156.5 R; 403/260; 403/30
[58] Field of Search ................. 92/254, 260, 248, 249, 92/258, 222, 224, 128, DIG. 1; 29/156.4 XR, 156.5 RXR, 156.5 A, 446, DIG. 25; 403/260 X, 30 X, 28, 404; 123/93 P; 228/165

[56] References Cited

U.S. PATENT DOCUMENTS

| | | | |
|---|---|---|---|
| 4,050,525 | 9/1977 | Kita | 92/222 |
| 4,242,948 | 1/1981 | Stang et al. | 123/193 P |
| 4,453,527 | 6/1984 | Wade | 123/193 P |
| 4,535,683 | 8/1985 | Dworak et al. | 92/224 |
| 4,548,126 | 10/1985 | Donomoto et al. | 92/213 |

FOREIGN PATENT DOCUMENTS

| | | | |
|---|---|---|---|
| 2829206 | 2/1979 | Fed. Rep. of Germany | 228/165 |
| 3238667 | 4/1984 | Fed. Rep. of Germany | 92/222 |

*Primary Examiner*—Robert E. Garrett
*Assistant Examiner*—Thomas E. Denion
*Attorney, Agent, or Firm*—Robert K. Rhea

[57] ABSTRACT

A pump plunger formed from a centrally bored cylinder of a preferred compound having counterbored ends provided with inwardly converging counterbore inner end limits for thermally shrinking and centering a bolt and its nut therein. One end of the bolt projects beyond the cylinder and is threadedly connected axially with a plunger mounting shaft. The cylinder is turned concentric with the mounting shaft.

7 Claims, 1 Drawing Sheet

PUMP PLUNGER

BACKGROUND OF THE INVENTION

1. Field of the Invention

The present invention relates to pumps and more particularly to a pump plunger.

Pumps utilizing plungers for moving fluids require frequent replacement as a result of wear usually caused by sand, silt and other extraneous material in fluid suspension or by pumping acidic fluids. Any one or all of which materially shorten the life of pump plungers, particularly those formed from metallic material.

2. Description of the Prior Art

Prior patents disclose the use of non-metallic materials, such as ceramic, for increasing pump plunger life, however, the principal difficulty of such pump plungers has been attaching the ceramic material to a core usually formed from metal which attaches the plunger to pump components, such as a cross head, for reciprocating the plunger. Prior art patents generally disclose attaching the cross head connecting plunger core to the surrounding ceramic cylinder by bonding material which has not been generally satisfactory.

This invention is distinctive over the prior art by forming a pump plunger cylinder from a selected long life non-metallic material and concentrically sealing the cylinder on a metallic core without the use of a bonding agent joining the core to its surrounding cylinder.

SUMMARY OF THE INVENTION

A centrally bored cylinder formed from any one of a selected series of compounds is counterbored from each of its ends for receiving an externally threaded bolt having a self centering head fitting in one counterbore. The other end of the bolt projects beyond the other end of the cylinder and is secured by a self centering nut in the other counterbore. A metallic shaft, having a transversely bored axially threaded socket in one end, nests the outwardly projecting bolt end and is anchored thereto by welding the shaft to the bolt in the transverse bore.

The principal object of this invention is to provide an improved thermally shrunk fit pump plunger concentrically turned for a close tolerance fit in pump cylinders which is highly resistant to wear by cuttings of parts, sand, silt, or the like, including erosive materials and is substantially unbreakable when constructed from a preferred material.

DESCRIPTION OF THE PREFERRED EMBODIMENTS

Figure 1:
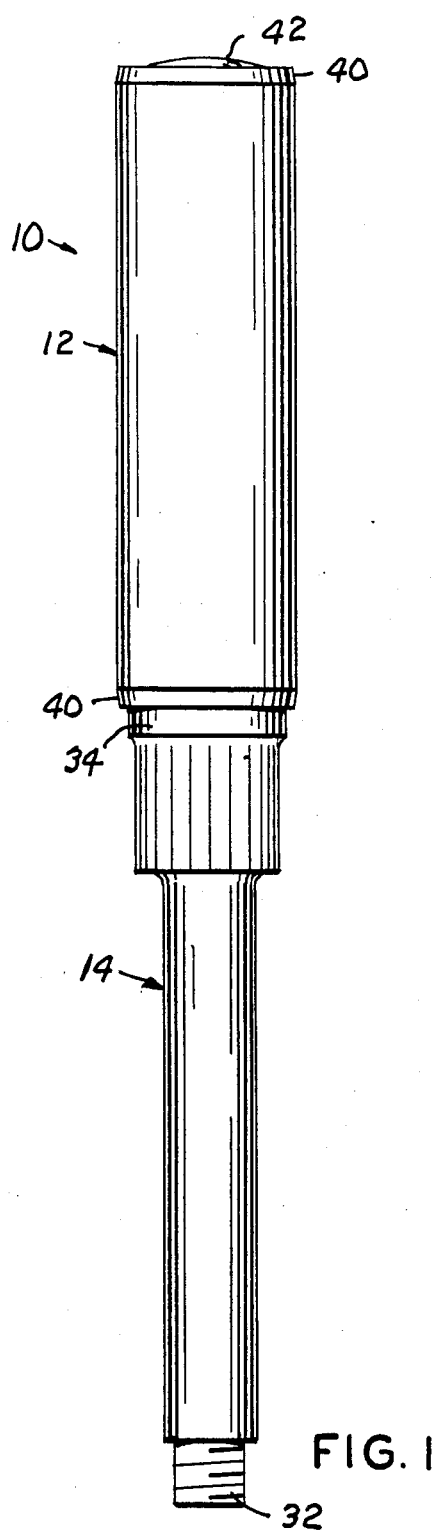
FIG. 1 is an elevational view of a pump plunger.
Figure 2:
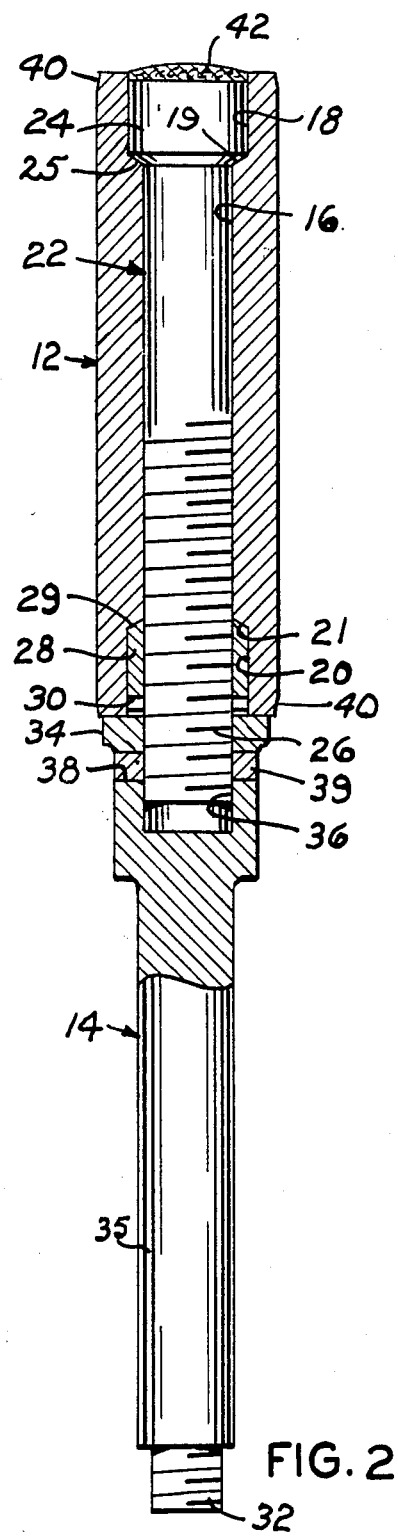
FIG. 2 is a longitudinal sectional view, partially in elevation.

Like characters of reference designate like parts in those figures of the drawings in which they occur.

In the drawings:

The reference numeral 10 indicates the plunger, as a whole, which is elongated step diameter cylindrical in general configuration. The plunger 10 principally comprises a cylinder portion 12 axially connected with a shaft 14 for connecting the plunger to a pump component, such as a cross head, not shown. The cylinder 12 is formed right circular cylindrical from any one of a selected series of compounds, such as zirconium oxide (partially stabilized zirconia), alumina ceramic, tungsten carbide or any one of the compounds or alloys marketed under the trademark Stellite (essentially cobalt and chromium) having a desired outside diameter and a bore 16 of selected diameter.

A preferred material is zirconium oxide but for economy alumina ceramic or tungsten carbide may be substituted. Zirconium oxide has many of the desired characteristics of steel, such as capable of being turned or bored prior to firing and in the green state but is preferred over ceramic for its resistance to thermal shock and over steel in some industrial uses for its resistance to abrasion, wear and breakage.

The respective ends of the cylinder are counterbored on a predetermined diameter, a selected depth, as at 18 and 20. The walls 19 and 21 defining the inward end limit of the respective counterbore 18 and 20 each form an annular tapered shoulder converging toward the longitudinal axis and respective opposite end of the cylinder. The taper angle being relatively small, on the order of 15° with respect to a diametric plane through the cylinder for the purpose presently explained.

An elongated externally threaded metallic bolt 22, preferably an Allen set screw, is axially received by the cylinder 12 with its diametrically enlarged head 24 nested by the counterbore 18 and the opposite threaded end portion 26 projecting a predetermined distance beyond the other end of the cylinder. The shoulder 25 defining the juncture of the bolt head 24 with its shank is cooperatively tapered to match the counterbore inward end wall 19 for centering the bolt head within the counterbore 18. A nut 28 threadedly surrounds the bolt 12 within the cylinder counterbore 20. The inwardly disposed end surface of the nut is similarly cooperatively tapered, as at 29, to mate with the inward end wall surface 21 of the counterbore 20 for centering the nut 28 within the counterbore 20. The opposite or outward end of the nut is provided with a transverse slot 30 for receiving a spanner wrench, not shown, to a hold the nut stationary with the cylinder while the bolt is threadedly tightened. The axial length of the bolt head 24 and nut 28 is slightly less than the depth of the respective counterbore so that, when assembled with the cylinder, their respective outer end surface is spaced inwardly from the plane of the cylinder respective ends.

The shaft 14 is bolt-like in general appearance with the outside diameter of its right circular cylindrical head 34 smaller than the outside diameter of the cylinder 12. The shank 35 of the shaft is provided with a reduced externally threaded end portion 32 opposite the head 34. The shaft head is axially bored and threaded, as at 36, for receiving the outwardly projecting threaded end 26 of the bolt. The shaft head is transversely line drilled, as at 38, to expose the bolt threads 26 and for welding the shank head 34 to the bolt following assembly of the shaft with the cylinder.

The pump plunger 10 components are preferably assembled in the following manner:

When the cylinder 12 is formed from thermally shock resistant zirconium oxide the bolt 22 is heated to approximately 600° F. and assembled with the ambient temperature cylinder 12, as described hereinabove. As the bolt cools (and shrinks) to ambient temperature the cooperating tapered or beveled surfaces 19-25 and 21-29 insures that the bolt axis is concentric with the longitudinal axis of the cylinder. The shaft head 34 is then threadedly tightened on the bolt threads 26 so that the adjacent right-circular cylindrical end surfaces of the cylinder and shaft are in contiguous contact and the axes of the cylinder and shaft are substantially concentric.

A different assembly sequence is followed when the cylinder 12 is formed from one of the other named compounds or alloys such as alumina ceramic or tungsten carbide, both being subject to chipping, cracking and/or breathing when thermally shocked as by inserting the heated bolt 22 into its bore. In this instance all the plunger components, namely, the cylinder 12, bolt 22, nut 28 and shaft 14 are simultaneously heated to the elevated temperature and assembled, as described hereinabove, while hot and allowed to cool to ambient temperature.

The coefficient of thermal expansion—cm $\times 10^{-6}$/°F. for the cylinder material in the above examples is:

Zirconium oxide (partially stabilized zirconia) . . . 5.6
Alumina ceramic . . . 4.3
Tungsten carbide . . . 2.8 to 4.0
Mild steel . . . 7.8

Thus it seems obvious that when the mild steel bolt 22, nut 28 and shaft 14 are heated with the alumina ceramic or tungsten carbide cylinder the relatively greater thermal expansion of the mild steel will result in an extremely tight fit of the bolt with the cylinder.

After welding the shaft to the bolt, and welding rod filling the bore 38 end portions, as at 39, the shank 35 of the shaft is chucked in a conventional metal lathe, not shown, or is turned between a center in shaft threaded end 32 and a center in recessed head of bolt 24, and the outside diameter of the cylinder ground to a predetermined finish diameter to insure concentricity of the cylinder with the shank of the shaft. While in the lathe the respective peripheral end surfaces of the cylinder are chamfered, as at 40.

With the exception of when the pump plunger 10 is to be used in pumping relatively high temperature fluids the socket in the bolt head 24 and adjacent cylinder end portion is filled with epoxy, as at 42, to prevent corrosion of the bolt head.

Obviously the invention is susceptible to changes or alterations without defeating its practicability. Therefore, I do not wish to be confined to the preferred embodiment shown in the drawings and described herein.

I claim:

1. A pump plunger, comprising:
a centrally bored non-metallic right-circular cylinder having a counterbore in its respective ends defining oppositely disposed axially spaced-apart annular shoulders converging toward each other and the cylinder longitudinal axis at a predetermined angle;
metallic core means having a greater thermal coefficient of expansion than said cylinder axially received and projecting, at one end, beyond one end of said cylinder,
said core means comprising a bolt having a threaded shank and having a head nested by one counterbore of the cylinder and characterized, at is juncture with the shank, by an annular bolt head shoulder converging toward the shank longitudinal axis on an angle complementary with the respective said cylinder annular shoulders;
a nut threadedly engaging said bolt shank within the other cylinder counterbore, the end surface of said nut facing said bolt head converging toward the axis of the bolt shank on an angle complementary with the respective said cylinder annular shoulders,
said metallic core means longitudinally stressing the cylinder in a shrink fit at its respective ends for insuring concentricity and a leak proof seal of the core means with the cylinder; and,
an elongated metallic shaft having an axial socket in a diametrically enlarged head at one end portion axially receiving the projecting end of said core for rigidly connecting said shaft with said core means one end portion.

2. The pump plunger according to claim 1 in which said cylinder is formed from alumina ceramic.

3. The pump plunger according to claim 1 in which the shaft head is transversely drilled and exposes a portion of the bolt shank threads for welding said shaft with the bolt shank.

4. The pump plunger according to claim 1 in which said cylinder is formed from zirconium oxide.

5. A pump plunger, comprising:
a centrally bored cylinder formed from a metallic compound having counterbored ends defining opposing axially spaced annular shoulders converging toward each other and the cylinder longitudinal axis at a predetermined angle;
metallic core means having a greater coefficient of expansion than said cylinder axially received and projecting, at one end, beyond one end of said cylinder,
said core means comprising a bolt having a threaded shank and having a head nested by one counterbore of the cylinder and characterized, at its juncture with the shank, by an annular shoulder converging toward the shank on an angle complementary with the respective said cylinder annular shoulders;
a nut threadedly engaging said bolt shank within the other cylinder counterbore, the end surface of said nut facing said bolt head converging toward the bolt shank on an angle complementary with the respective said cylinder annular shoulders,
said metallic core means longitudinally stressing the cylinder in a shrink fit at its respective ends for insuring concentricity and a leak proof seal of the core means with the cylinder; and,
an elongated metallic shaft having an axial socket in a diametrically enlarged head at one end portion threadedly receiving the projecting end of said core and rigidly connecting said shaft with said core means one end portion.

6. The pump plunger according to claim 5 in which the head of said shaft is transversely drilled for exposing a portion of the bolt shank threads and welding said shaft with the bolt shank.

7. The pump plunger according to claim 6 in which said cylinder is formed from tungsten carbide.

* * * * *